US007893155B2

(12) United States Patent
Ito et al.

(10) Patent No.: US 7,893,155 B2
(45) Date of Patent: *Feb. 22, 2011

(54) MATERIAL OR CURABLE SOLVENT-BASED TOPCOATING MATERIAL, AND COATING MATERIAL AND COATING FILM COMPRISING OR FORMED FROM THE SAME

(75) Inventors: Kohzo Ito, Tokyo (JP); Jun Araki, Tokyo (JP); Tatsuya Suzuki, Isehara (JP); Masahiko Yamanaka, Isehara (JP); Kentarou Watanabe, Atsugi (JP)

(73) Assignees: Nissan Motor Co., Ltd., Kanagawa (JP); The University of Tokyo, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/662,128

(22) Filed: Mar. 31, 2010

(65) Prior Publication Data

US 2010/0190019 A1   Jul. 29, 2010

Related U.S. Application Data

(62) Division of application No. 12/089,329, filed as application No. PCT/JP2006/319966 on Oct. 5, 2006.

(30) Foreign Application Priority Data

Oct. 6, 2005  (JP) .............................. 2005-293830
Oct. 6, 2005  (JP) .............................. 2005-293831

(51) Int. Cl.
*C08G 63/48* (2006.01)
(52) U.S. Cl. .................. 525/54.4; 525/54.44; 525/54.45
(58) Field of Classification Search ................ 525/54.4, 525/54.44, 54.45
See application file for complete search history.

(56) References Cited

U.S. PATENT DOCUMENTS

| | | | |
|---|---|---|---|
| 4,972,005 | A | 11/1990 | Aoki et al. |
| 5,538,655 | A | 7/1996 | Fauteux et al. |
| 6,100,329 | A | 8/2000 | Gibson et al. |
| 6,527,887 | B1 | 3/2003 | Ruebner et al. |
| 6,828,378 | B2 | 12/2004 | Okumura et al. |
| 7,151,152 | B2 | 12/2006 | Takata et al. |
| 7,186,355 | B2 | 3/2007 | Swager |
| 2003/0108751 | A1 | 6/2003 | Hasegawa et al. |
| 2003/0138398 | A1 | 7/2003 | Okumura et al. |
| 2004/0162275 | A1 | 8/2004 | Yui et al. |

FOREIGN PATENT DOCUMENTS

| | | |
|---|---|---|
| CN | 1426424 A | 6/2003 |
| EP | 1283218 A1 | 2/2003 |
| EP | 1 707 587 A1 | 10/2006 |
| EP | 1 710 269 A1 | 10/2006 |
| EP | 1 734 066 A1 | 12/2006 |
| EP | 1 921 104 A1 | 5/2008 |
| JP | 06-29382 B2 | 4/1994 |
| JP | 2003-293146 A | 10/2003 |
| JP | 2004-131601 A | 4/2004 |
| JP | 2005/075979 A | 3/2005 |
| JP | 2005/143920 A | 6/2005 |
| JP | 2006-241396 A | 9/2006 |
| JP | 2007/091938 A | 4/2007 |
| JP | 2007/099988 A | 4/2007 |
| JP | 2007/099989 A | 4/2007 |
| JP | 2007/099990 A | 4/2007 |
| JP | 2007/099991 A | 4/2007 |
| JP | 2007/099993 A | 4/2007 |
| JP | 2007/099994 A | 4/2007 |
| JP | 2007/099995 A | 4/2007 |
| WO | WO 01/83566 A1 | 11/2001 |
| WO | WO 03/074099 A1 | 9/2003 |
| WO | WO 2005/080469 A1 | 9/2005 |
| WO | WO 2005/080470 A1 | 9/2005 |
| WO | WO 2005/095493 A1 | 10/2005 |
| WO | WO 2006/090819 A1 | 8/2006 |

OTHER PUBLICATIONS

Jun Araki et al., "Preparation and Characterization of Various Polyrotaxane Derivatives for the Synthesis of Functional Slide/Ring Gels", Polymer Preprints, Japan, vol. 54, No. 2 (2005), pp. 2755/2756.

Jun Araki et al., "Polyrotaxane Oyobi Polyrotaxane Yudotai no Gosei to Seishitsu", Journal of the Japan Society of Colur Material, vol. 79, No. 7 (2006), pp. 290/295.

Chinese Office Action issued by Chinese Patent Office dated Aug. 21, 2009 for Chinese Patent Application No. 2006800369043.

*Primary Examiner*—Bernard Lipman
(74) *Attorney, Agent, or Firm*—Foley & Lardner LLP

(57) ABSTRACT

To provide a coating material for a curable solvent-based topcoating material, having excellent marring resistance, chipping resistance, producing no crack and excellent in performances such as weatherability, stain resistance, adhesion and the like, and a curable solvent-type topcoating material using such a material.

A coating material is blended preferably in an amount of 60 to 90% by mass relative to paint film forming components thereby to form a curable solvent-based topcoating material. The coating material includes an oleophilic polyrotaxane which includes a cyclic molecule, a linear molecule including the cyclic molecule with piercing through the cyclic molecule, and blocking groups which are placed at both end terminals of the linear molecule to prevent the cyclic molecule from leaving from the linear molecule, at least one of the above-mentioned liner molecule and the cyclic molecule having hydrophobic modification group.

21 Claims, 3 Drawing Sheets

(A)

(B)

MATERIAL OR CURABLE SOLVENT-BASED TOPCOATING MATERIAL, AND COATING MATERIAL AND COATING FILM COMPRISING OR FORMED FROM THE SAME

This application is a divisional application of U.S. application Ser. No. 12/089,329, filed Apr. 4, 2008, which is the National Stage application of International Application No. PCT/JP2006/319966, filed Oct. 5, 2006, which claims the priority to Japan Application Nos. 2005-293830 and 2005-293831, both filed Oct. 6, 2005. All of which are hereby incorporated by reference in their entirety.

BACKGROUND OF THE INVENTION

1. Technical Field

This invention relates to a curable solvent-based topcoating material, and a coating material and coating film using this, and more specifically a material for the curable solvent-based topcoating material, applicable particularly to products to be used in fields requiring marring resistance, such as mainly an automotive vehicle body; resinous formed articles in inside and outside of house; wood products such as stairs, floor, furniture and the like; an aluminum wheel, a door mirror or the like which are treated by plating, vapor deposition, sputtering and the like, and the coating material and coating film using this.

2. Background Art

Hitherto, a resinous formed article such as a polycarbonate plate or an acrylic plate are inferior in various physical properties such as hardness, weatherability, stain resistance, solvent resistance and the like, and therefore a surface treatment is applied in order to compensate these physical properties.

For such a surface treatment, for example, a curable paint such as an ambient temperature drying paint or a two package type urethane resin paint are used (see, for example, Patent Literature 1)

However, a treatment film using the paint tends to be readily scratched, and formed scratches tend to be conspicuous.

Patent Literature 1: Japanese Patent Provisional Publication No. 2004-131601

Additionally, for a design purpose, a metallic mirror treatment such as plating, vapor deposition, sputtering or the like is used (see, for example, Patent Literature 2).

However, in case of carrying out the metallic mirror treatment, a treatment film tends to be readily scratched, and formed scratches tend to be conspicuous. Additionally, the surface treatment as mentioned above is usually carried out after the mirror treatment such as sputtering; however, an obtained treatment film tends to be readily scratched, and formed scratches tend to be conspicuous.

Patent Literature Japanese Patent Provisional Publication No. 2003-293146

Further, regarding a top coat for an automotive vehicle, a high-durability intention is recently being strengthened in order to maintain a painted appearance at a new car time for a long period of time. As a result, a marring resistance is being required to prevent a coated paint from being scratched even by a car washer, dust, flying stone or the like.

As a paint having a marring resistance, hitherto an ultraviolet ray (UV) curable paint, an electron beam (EB) curable paint, a silica-based hard coating agent, a two package type acrylic urethane-based soft paint or the like is known (see, for example, Patent Literature 3).

Patent Literature 3: Japanese Patent Publication No. 6-29382

DISCLOSURE OF THE INVENTION

Problems to be Solved by the Invention

However, with the above-mentioned UV curable paint, EB curable paint or silica-based hard coating agent, problems of lowering adhesion of the paint to a material and of forming crack tend to readily arise under using hard monomer for realizing a high hardness and an increase in strain during hardening and shrinkage owing to an increased crosslinkage density.

In this regard, the above-mentioned two package type acrylic urethane-based soft paint raises no problem of chipping and cracking; however, there many cases where tack feeling is left, so that the paint has a defect of being inferior in weatherability and stain resistance.

The present invention is made in view of such problems of conventional techniques, and an object of the present invention is to provide a material for a curable solvent-based topcoating material, having excellent marring resistance, chipping resistance and able to form a paint film difficult to form crack and the like, and coating material and film using this.

Means for Solving Problems

As a result of repeating eager studies to attain the above-mentioned object, the present inventors have found that the above-mentioned object can be attained and reached the completion of the present invention, by using an oleophilic polyrotaxane whose linear molecule and cyclic molecule are provided with hydrophilic modification groups.

In other words, a material for a curable solvent-based topcoating material, according to the present invention is characterized by comprising an oleophilic polyrotaxane singly or both the polyrotaxane and another resin, the oleophilic polyrotaxane including a cyclic molecule, a linear molecule including the cyclic molecule with piercing through the cyclic molecule, and blocking groups which are placed at both end terminals of the linear molecule to prevent the cyclic molecule from leaving from the linear molecule, the liner molecule and/or the cyclic molecule having a hydrophobic modification group. Examples of the another resin are acrylic resin, epoxy resin, polyester resin and the like; however, the another resin is not limited to these.

Additionally, a preferred embodiment of the material for a curable solvent-based topcoating material, according to the present invention is characterized in that the cyclic molecule has an inclusion amount ranging from 0.06 to 0.61 relative to 1 which is the maximum inclusion amount of the cyclic molecule capable of being included by the linear molecule.

Further, another preferred embodiment of the material for a curable solvent-based topcoating material, according to the present invention is characterized in that the linear molecule has a molecular weight ranging from 1,000 to 45,000.

Additionally, the curable solvent-based topcoating material according to the present invention is characterized by using the material for a curable solvent-based topcoating material.

Further, the curable solvent-based topcoating paint film is formed by solidifying the curable solvent-based topcoating material.

Furthermore, the laminated coating film according to the present invention uses the above-mentioned solvent-based topcoating material and formed by successively forming a base coat paint film and a clear paint film using the solvent-based topcoating material on an article to be coated; by successively forming a base coat paint film using the solvent-based topcoating material and a clear paint film on an article to be coated; or by forming an enamel paint film using the solvent-based topcoating material on an article to be coated.

EFFECTS OF THE INVENTION

According to the present invention, the oleophilic polyrotaxane whose linear molecule and/or cyclic molecule are provided with hydrophobic modification groups is used, thereby making it possible to provide the material for the curable solvent-based topcoating material, able to form a paint film having excellent marring resistance and difficult to form crack and the like, and the coating material and coating film using this.

THE BEST MODE FOR CARRYING OUT THE INVENTION

Hereinafter, a material for a curable solvent-based topcoating material, according to the present invention will be discussed in detail. In the specification of the present application, "%" represents % by mass unless otherwise specified.

As discussed above, the material for a curable solvent-based topcoating material, according to the present invention includes single oleophilic polyrotaxane, or both the polyrotaxane and other resin(s).

This oleophilic polyrotaxane includes a cyclic molecule, and a linear molecule having blocking groups at its both end terminals. The linear molecule includes the cyclic molecule with piercing through the opening section of the cyclic molecule. Further, the blocking groups placed at both end terminals of the linear molecule prevent the included cyclic molecule from leaving from the linear molecule.

Furthermore, either one or both of the linear molecule and the cyclic molecule constituting this polyrotaxane has hydrophobic modification group(s).

FIG. 1 is a schematic illustration which conceptually shows the oleophilic modified polyrotaxane.

In the same figure, this hydrophobic modified polyrotaxane 5 has the linear molecule 6, the cyclodextrin 7 as the cyclic molecule, and the blocking groups 8 placed at the both end terminals of the linear molecule 6, in which the linear molecule 6 includes the cyclic molecule 7 with piercing through the opening section of the cyclic molecule 7.

The cyclodextrin 7 has the hydrophobic modification groups 7a.

By using such an oleophilic polyrotaxane, a material for a coating material miscible with a hydrophobic solvent can be obtained. Additionally, when it is applied to a coating material, the durability of a product can be improved. In other words, the coating material is improved in marring resistance and chipping resistance effectively because no baneful effect is applied to other required performances. Further, the coating material is excellent in weatherability, stain resistance, adhesion and the like.

Here, the above-mentioned linear molecule is sufficient to be substantially linear and is sufficient to have a branched chain as far as it can include the cyclic molecule as a rotator in such a manner as to be rotatable to exhibit a pulley effect.

Additionally, the length of the linear molecule is not particularly limited as far as the cyclic molecule can exhibit the pulley effect, though it is affected by the size of the cyclic molecule.

In the material for a curable solvent-based topcoating material, according to the present invention, either one or both of the linear molecule and the cyclic molecule has the hydrophobic modification group, by which the material is soluble in an organic solvent.

Such exhibition of the oleophilic characteristic provides a reaction field, typically the crosslinking field, of the organic solvent to polyrotaxane which is hitherto almost insoluble or insoluble in a water-like solvent or an organic solvent. In other words, the material for a curable solvent-based topcoating material, according to the present invention is improved in reactivity so that crosslinking with other polymers and modification with modification groups can be readily accomplished in presence of the organic solvent.

The above-mentioned modification group has the hydrophobic group or both the hydrophobic group and the hydrophilic group, and is sufficient to be hydrophobic as a whole.

Examples of such hydrophobic group are, for example, alkyl group, benzyl group, benzene derivative-containing group, acyl group, silyl group, trityl group, tosyl group, urethane linkage, ester linkage, ether linkage and the like; however, the hydrophobic group is not limited to these.

Examples of such hydrophilic group are, for example, alkyl group, carboxyl group, sulphonic acid group, sulfuric ester group, phosphoric ester group, primary to tertiary amino group, quaternary ammonium salt group, hydroxyalkyl group, and the like; however, the hydrophilic group is not limited to these.

Such a linear molecule is not limited to a particular one, in which the examples of the linear molecule are polyalkyls, polyesters such as polycaprolactone, polyethers, polyamides, polyacrylics and a linear molecule having benzene ring(s).

In concrete, examples of the linear molecule are polyethylene glycol, polyisoprene, polybutadiene, polypropylene glycol, polytetrahydrofuran, polydimethylsiloxane, polyethylene, polypropylene, and the like. As such a linear molecule, polyethylene glycol and polycaprolactone are particularly preferable.

Additionally, the molecular weight of the linear molecule is preferably within a range of from 1,000 to 45,000, more preferably within a range of from 10,000 to 40,000, furthermore preferably within a range of from 20,000 to 35,000.

If the molecular weight is less than 1,000, the pulley effect is degraded so that the elongation percentage of a coating film is lowered, thereby providing a possibility that marring resistance and chipping resistance are degraded. If the molecular weight exceeds 45,000, a solubility lowers, providing a possibility that an appearance such as smoothness or luster as enamel for film formation on a surface is lowered.

The above-mentioned linear molecule preferably has reactive groups at its both end terminals, by which the linear molecule can be readily reacted with the above-mentioned blocking groups.

Such reactive groups may be suitably changed in accordance with kinds of the blocking group to be used, in which examples of the reactive groups are hydroxyl group, amino group, carboxyl group, thiol group and the like.

Examples of the above-mentioned cyclic molecule are a variety of cyclic materials and not limited to particular ones as far as they produce the pulley effect by being included by the linear molecule as discussed above. Many cyclic molecules have hydroxyl group(s).

Additionally, the cyclic molecule is sufficient to be substantially cyclic and therefore includes a C-shaped one which does not form a completely closed ring.

Additionally, the above-mentioned cyclic molecule preferably has reactive groups, by which the linear molecule can be readily crosslinked with other polymers and combined with modification group(s).

Such reactive groups may be suitably changed, in which examples of the reactive groups are hydroxyl group, amino group, carboxyl group, thiol group, aldehyde group.

Additionally, the reactive groups are preferably reactive groups which cannot react with the blocking groups when the blocking groups are formed (blocking reaction) as discussed after.

Further, concrete examples of the above-mentioned cyclic molecule are a variety of cyclodextrins, for example, α-cyclodextrin (the number of glucose: 6), β-cyclodextrin (the number of glucose: 7), γ-cyclodextrin (the number of glucose: 8), dimethylcyclodextrin, glucocylcyclodextrin and derivatives and modified compounds of these, and crown ethers, benzocrowns, dibenzocrowns, dicyclohexanocrowns and derivatives and modified compounds of these.

One kind of the above-mentioned cyclodextrins can be singly used, or not less than two kinds of them are used in combination.

Particularly, α-cyclodextrin, β-cyclodextrin and γ-cyclodextrin are preferable, in which α-cyclodextrin is preferable from the viewpoint of the characteristics of being included.

Additionally, if hydrophobic modification group(s) is introduced to hydroxyl group(s) of the cyclodextrin, the solubility of the oleophilic polyrotaxane in a solvent can be further improved.

At this time, a modification degree of the cyclodextrin with the above-mentioned hydrophobic modification groups is preferably not less than 0.02, more preferably not less than 0.04 and furthermore preferably not less than 0.06 on the assumption that the maximum number of modifiable hydroxyl groups of the cyclodextrin is 1.

If it is less than 0.02, the solubility in the organic solvent is insufficient so that insoluble seed (projection sections derived from foreign matter adhesion and the like) may be produced.

Here, the maximum number of the modifiable hydroxyl groups of the cyclodextrin is, in other words, the number of all hydroxyl groups which the cyclodextrin have had before the modification. The modification degree is, in other words, a ratio of the number of the modified hydroxyl groups to the number of all hydroxyl groups.

The hydrophobic group is sufficient to be at least one, in which it is preferable that each cyclodextrin ring has one hydrophobic group.

Additionally, by introducing the hydrophobic group having functional group(s), it is possible to improve the reactivity of the polyrotaxane with other polymers.

As an introduction method for the above-mentioned hydrophobic modification group, the following method will be employed.

A first method is as follows: For example, a cyclodextrin is used as the cyclic molecule of the polyrotaxane, and hydroxylpropylation of hydroxyl groups of the cyclodextrin is carried out with propylene oxide. Thereafter, ε-caprolactone is added, and then tin 2-ethylhexanoate is added. The modification rate can be freely controlled by changing the addition amount of ε-caprolactone at this time.

In the material for a curable solvent-based topcoating material, according to the present invention, the number (an inclusion amount) of the cyclic molecules included by the linear molecule is preferably within a range of 0.06 to 0.61, more preferably within a range of from 0.11 to 0.48, and furthermore preferably within a range of from 0.24 to 0.41 on the assumption that the maximum inclusion amount is 1.

If the inclusion amount is less than 0.06, the pulley effect will be degraded, and there is a possibility that the elongation percentage of a coating film is lowered. If the inclusion amount exceeds 0.61, the cyclic molecules are placed too close each other so that the moveability of the cyclic molecules may be lowered, which may lower the elongate percentage, marring resistance and chipping resistance of the coating film.

Additionally, the inclusion amount of the cyclic molecule can be controlled as set forth below.

A first method is as follows: BOP reagent (benzotirazole-1-yl-oxy-tris(dimethylamino)phosphonium hexafluorophosphate), HOBt, adamantane amine and diisopropylethyl amine are added in this order in DMF (dimethylformamide) thereby form a solution. On the other hand, an inclusion complex in which the linear molecule pierces the cyclic molecule is dispersed in a mixture solvent of DMF/DMSO (dimethylsulfoxide) thereby to obtain a solution. These both solutions are mixed, in which the inclusion amount of the cyclic molecule can be freely controlled by changing a mixing ratio of DMF/DMSO. The inclusion amount of the cyclic molecule increases as the rate of DMF in DMF/DMSO is larger.

The blocking group may be any group which can maintain a condition where the linear molecule pierces through the cyclodextrin constituting the cyclic molecule, upon being placed at each of the both end terminals of the linear molecule as discussed above.

Such a group is a group having a "bulkiness" or a group having an "ionic character". Here, "group" means a variety of groups including a molecule group and a polymer group.

Examples of the group having the "bulkiness" are a spherical group and a side wall-shaped group.

Additionally, the ionic character of the group having the "ionic character" and the ionic character of the cyclic molecule are mutually affected, for example, repel each other, so as to maintain a condition where the linear molecule pierces through the cyclic molecule.

Concrete examples of such a blocking group are dinitrophenyl groups such as 2,4-dinitrophenyl group, 3,5-dinitrophenyl group and the like, cyclodextrins, adamantane groups, trityl groups, fluoresceins, pyrenes, and derivatives and modified compounds of these.

The material for a curable solvent-based topcoating material, according to the present invention, as discussed above is constituted of polyrotaxane having hydrophobic modification group(s), in which the oleophilic polyrotaxane can be typically produced as set forth below.

(1) A step of mixing a cyclic molecule and a linear molecule so that the linear molecule includes the cyclic molecule with piecing through the opening section of the cyclic molecule, (2) a step of blocking the both end terminals (the both end terminals of the linear molecule) of an obtained pseudo-polyrotaxane with blocking groups so as to make adjustment to prevent the cyclic molecule from releasing from a piercing condition, and (3) a step of modifying hydroxyl group(s) held by the cyclic molecule of an obtained polyrotaxane with hydrophobic modification group(s).

The hydrophobic modified polyrotaxane can be obtained also by using, as a cyclic molecule, a compound in which hydroxyl group(s) previously held by the cyclic molecule has been previously modified with hydrophobic modification groups, at the above-mentioned step (1). In this case, the above-mentioned step (3) may be omitted.

By such a production method, the material for a curable solvent-based topcoating material, excellent in solubility in an organic solvent can be obtained as discussed above.

The organic solvent is not limited to a particular one. Examples of the organic solvent are alcohols such as isopropyl alcohol, butyl alcohol and the like, esters such as ethyl acetate, butyl acetate and the like, ketones such as methyl ethyl ketone, methyl isobutyl ketone and the like, ethers such as diethyl ether, dioxane and the like, and hydrocarbon solvents such as toluene, xylene and the like, in which the oleophilic polyrotaxane exhibits a good solubility in a solvent prepared by mixing two or more kinds of these.

In the present invention, the oleophilic polyrotaxane may be crosslinked as far as it is soluble in an organic solvent. Such an oleophilic crosslinked polyrotaxane may be used in place of a non-crosslinked hydrophilic polyrotaxane or upon being mixed with a non-crosslinked hydrophilic polyrotaxane.

An example of such an oleophilic crosslinked polyrotaxane is an oleophilic polyrotaxane which is crosslinked with a relatively low molecular weight polymer which has typically a molecular weight of about several thousands.

Additionally, in the present invention, it is preferable from the viewpoint of improving the reactivity of the oleophilic polyrotaxane with other polymers, that each of all or some of the hydrophobic modification groups has a functional group.

It is preferable that such a functional group is sterically placed outside of the cyclodextrin, in which reaction of bonding or crosslinking of the hydrophobic modified polyrotaxane with polymer can be readily carried out with this functional group.

Such a functional group may be suitably changed, for example, in accordance with kinds of solvent to be used in case that no crosslinking agent is used. However, such a functional group may be suitably changed in accordance with kinds of crosslinking agent in case that crosslinking agent is used.

Further, in the present invention, concrete examples of the functional group are, for example, hydroxyl group, carboxyl group, amino group, epoxy group, isocyanate group, thiol group, aldehyde group and the like, in which the functional group is not limited to these.

In the hydrophobic modified polyrotaxane, the above-mentioned functional group may be used singly with one kind thereof or in combination of not less than two kinds thereof.

Such functional group is particularly a residue group of a compound combined with the hydroxyl groups of the cyclodextrin, and the residue group preferably has hydroxyl group, carboxyl group, amino group, epoxy group and/or isocyanate group, in which hydroxyl group is preferable from the viewpoint of variety of reactions.

A compound forming such a functional group is, for example, ε-caprolactone; however, the compound is not limited to this.

For example, the compound forming the functional group may be a polymer if a solubility improving effect of the hydrophobic modified polyrotaxane in the organic solvent is not so lowered, in which the polymer preferably has a molecular weight of, for example, several thousands from the viewpoint of solubility.

The above-mentioned functional group is preferably a group which can make a reaction in a condition where the blocking groups cannot leave as discussed after.

Next, a curable solvent-based topcoating material and a solvent-based topcoating film according to the present invention will be discussed in detail.

The curable solvent-based topcoating material according to the present invention is formed from the above-mentioned material for a curable solvent-based topcoating material. Additionally, the solvent-based topcoating film according to the present invention is formed by solidifying the curable solvent-based topcoating material.

By this, during formation of the coating film, the hydrophobic modification groups and other functional groups in the material for a curable solvent-based topcoating material react with coating film forming components to form a crosslinked polyrotaxane, so that the topcoating material becomes excellent in marring resistance and chipping resistance. Additionally, crack and the like are difficult to be produced. Further, the topcoating material is excellent also in weatherability, stain resistance, adhesion and the like.

In general, the crosslinked polyrotaxane means a substance which is formed by crosslinking between single polyrotaxane and other polymers. During formation of the coating film, the crosslinked polyrotaxane is formed by crosslinking between the polyrotaxane constituting the material for an above-mentioned curable solvent-based topcoating material and the coating film forming components (polymers, hardening agents and the like). This coating film forming components are combined with the polyrotaxane through the cyclic molecules of the polyrotaxane.

Hereinafter, the crosslinked polyrotaxane will be discussed.

In FIG. 2, the crosslinked polyrotaxane is conceptually shown.

In the same figure, the crosslinked polyrotaxane 1 has the polymer 3 and the above-mentioned oleophilic polyrotaxane 5. This polyrotaxane 5 is combined at crosslinking points 9 with the polymer 3 and the polymer 3' through the cyclic molecules 7.

When a deformation stress in a direction of arrows X-X' at a (A) section in FIG. 2 is loaded to the crosslinked polyrotaxane having such a configuration, the crosslinked polyrotaxane 1 can deform as indicated at a (B) section in FIG. 2 thereby absorbing this stress.

In other words, as shown in the (B) section in FIG. 2, the cyclic molecule is movable along the linear molecule 6 under the pulley effect, and therefore the crosslinked polyrotaxane can absorb the above-mentioned stress thereinside.

Thus, the crosslinked polyrotaxane has the pulley effect as shown in the figure and therefore has excellent elasticity, viscoelasticity and mechanical properties as compared with conventional gel-like materials.

Additionally, the oleophilic polyrotaxane as a precursor of this crosslinked polyrotaxane is improved in solubility in an organic solvent, and therefore its crosslinking or the like in the organic solvent is readily made.

Accordingly, the crosslinked polyrotaxane can be readily obtained under a condition where an organic solvent exists. Particularly, the crosslinked polyrotaxane can be readily produced by crosslinking the oleophilic polyrotaxane with the coating film forming components which are soluble in an organic solvent.

Accordingly, the material for a curable solvent-based topcoating material, according to the present invention is being extended in its application range and applicable, for example, to paints or adhesives using a coating film polymer which is soluble in an organic solvent, particularly paints, resin base materials and adhesives for automotive vehicles requiring a car-washing resistance, a scratching resistance, a chipping resistance, an impact resistance and a weatherability, and also to paints, resin base materials and the like for home electric appliances, in which the excellent pulley effect can be exhibited in such applications.

From the other viewpoints, the crosslinked polyrotaxane is formed as a composite of the coating film forming components and the polyrotaxane without degrading the physical properties of the coating film forming components which are crosslinking objects of the oleophilic polyrotaxane.

Accordingly, according to the below-discussed production method of the crosslinked polyrotaxane, not only a material having both the physical properties of the above-mentioned coating film forming components and the physical properties of the oleophilic polyrotaxane itself can be obtained, but also a coating film having a desired mechanical strength and the like can be obtained by selecting kinds of polymers.

In case that the crosslinking objects are hydrophobic and their molecular weight is not so high, for example, up to about several thousands, the crosslinked polyrotaxane is soluble in an organic solvent.

Here, a production method of the crosslinked polyrotaxane will be discussed.

The crosslinked polyrotaxane can be typically formed by (a) mixing the material for a curable solvent-based topcoating material with the other coating film forming components, (b) physically and/or chemically making crosslinking of at least a part of the coating film forming components, and (c) combining the at least a part of the coating film forming components and the oleophilic polyrotaxane through the cyclic molecule (hardening reaction).

The oleophilic polyrotaxane is soluble in an organic solvent, and therefore the steps (a) to (c) can be smoothly carried out in the organic solvent. Additionally, these steps can be smoothly carried out by using a hardening agent.

At the steps (b) and (c), a chemical crosslinking is preferably made. For example, this is such that the hydroxyl groups disposed in the cyclic molecules of the oleophilic polyrotaxane as discussed above and a polyisocyanate compound as an example of the coating film forming components react with each other to repeatedly form urethane linkages, thereby obtaining the polyrotaxane. Additionally, the steps (b) and (c) may be carried out at the nearly same time.

The mixing step at the step (a) depends on the coating film forming components and can be carried out without a solvent or in a solvent. The solvent can be removed under a heating treatment or the like during the coating film formation.

Additionally, the above-mentioned oleophilic polyrotaxane is contained preferably in an amount of 1 to 90% by mass relative to the coating film forming components (resinous solid content and the like). The oleophilic polyrotaxane is contained more preferably in an amount of 30 to 90% by mass, and particularly preferably in an amount of 60 to 90% by mass relative to the coating film forming components.

If it is contained in an amount less than 1%, the pulley effect is lowered thereby providing such a possibility that the elongation percentage is lowered. If it is contained in an amount exceeding 90%, the smoothness of the coating film is lowered thereby providing a possibility of degrading its external appearance.

Further, the above-mentioned topcoating material is preferably formed by mixing resinous components, hardening agents, additives, pigments, brightening agents or solvents, or one obtained by freely combining these with the material for the topcoating material.

Here, the above-mentioned resinous components are not limited to particular ones, and the main chain or side chain of them preferably has hydroxyl group, amino group, carboxyl group, epoxy group, vinyl group, thiol group or a photo-crosslinking group, or a group relating to any combination of these.

Examples of the photocrosslinking group are cinnamic acid, coumarin, chalcone, anthracene, styrylpyridine, styrylpyridinium salt and styrylquinoline salt and the like.

Additionally, not less than two kinds of the resinous components may be used. In this case, it is good that at least one kind resinous component is combined with the polyrotaxane through the cyclic molecule.

Further, such resinous components may be homopolymer or copolymer. In case of the copolymer, the copolymer may be constituted of not less than two kinds of monomers, and may be any of a block copolymer, an alternating copolymer, a random copolymer and a graft copolymer.

Concrete examples of the resinous components are polyvinyl alcohol, polyvinyl pyrrolidone, poly(meth)acrylic acid, cellulose-based resin such as carboxylmethyl cellulose, hydroxyethyl cellulose, hydroxypropyl cellulose and the like, polyacryl amide, polyethylene oxide, polyethylene glycol, polypropylene glycol, polyvinyl acetal-based resin, polyvinylmethyl ether, polyamine, polyethylene imine, casein, gelatin, starch, and a copolymer of these, polyolefin-based resin such as polyethylene, polypropylene, and a copolymer resin of these with other olefin-based monomers, polyester resin, polyvinyl chloride resin, polystyrene-based resin such as polystyrene, acrylonitrile-styrene copolymer resin or the like, acrylic resin such as polymethylmethacrylate, (meth)acrylate ester copolymer, acrylonitrile-methyl acrylate copolymer or the like, polycarbonate resin, polyurethane resin, vinyl chloride-vinyl acetate copolymer resin, polyvinyl butyral resin and a derivative or a modified compound of these, polyisobutylene, polytetrahydrofuran, polyaniline, acrylonitrile-butadiene-styrene copolymer (ABS resin), polyamides such as Nylon (registered trade mark) and the like, polyimides, polydienes such as polyisoprene, polybutadiene and the like, polysiloxanes such as polydimethyl siloxane and the like, polysulfones, polyimines, polyacetic anhydrides, polyureas, polysulfides, polyphosphazenes, polyketones, polyphenylenes, polyhaloolefins, and derivatives of these.

The derivatives preferably have hydroxyl group, amino group, carboxyl group, epoxy group, vinyl group, thiol group, or the photocrosslinking group, or a group relating to a combination of these.

Concrete examples of the above-mentioned hardening agent are melamine resin, polyisocyanate compound, block isocyanate compound, cyanuric chloride, trimethoyl chloride, terephthaloyl chloride, epichlorohydrin, dibromobenzene, glutaraldehyde, phenylene diisocyanate, tolylene diisocyanate, divinyl sulfone, 1,1'-carbonyl diimidazole, and alkoxy silanes, in which these are used singly with one kind or in combination of not less than two kinds.

Additionally, as the above-mentioned hardening agent, one having a molecular weight of less than 2000, preferably less than 1000, more preferably less than 600, furthermore preferably less than 400 may be used.

Concrete examples of the above-mentioned additives to be used are a dispersant, an ultraviolet ray absorbing agent, a light stabilizer, a surface conditioning agent, an anti-foaming agent, and the like.

Concrete examples of the pigments to be used are an organic coloring pigment such as an azo-based pigment, a phthalocyanine-based pigment, a perylene-based pigment or the like, and an inorganic coloring pigment such as carbon black, titanium dioxide, red iron oxide or the like.

Concrete examples of the above-mentioned brightening agents to be used are an aluminum pigment, a mica pigment and the like.

Concrete examples of the above-mentioned solvents to be used are esters such as ethyl acetate, butyl acetate, isobutyl acetate and the like, ketones such as methyl ethyl ketone, methyl isobutyl ketone, ethers such as diethyl ether, dioxane and the like, hydrocarbon solvents such as toluene, xylene, solvesso and the like, and long-chain alcohols high in hydrophobicity, in which two or more kinds of these may be suitably mixed. Additionally, even though each solvent contains a slight amount of a water-like solvent such as water, butyl cellosolve acetate and/or the like, it may be used if it can be considered to be an organic solvent as a whole.

Further, the above-mentioned topcoating material can be a gloss paint or a flat paint.

In order to make the flat paint, it is sufficient to add a flatting agent(s) such as silica, plastic beads and/or the like in addition to the above-mentioned components.

Furthermore, the above-mentioned topcoating material can be used as a general clear paint, a general paint for base coat or a general enamel paint so as to form a clear paint film, a base coat paint film or an enamel paint film.

Concretely, the topcoating material is prepared as an acrylic paint, a melamine-based paint, a urethane-based paint, a polyester-based paint and the like.

Additionally, these may be of one package type or of two package type (for example, urethane resin paint) or the like.

Though not specifically limited, it is preferable that the film thickness of the above-mentioned clear paint is about 20 to 40 μm; the film thickness of the above-mentioned base coat is about 10 to 15 μm; and the above-mentioned enamel paint film is about 20 to 40 μm.

Next, a laminated coating film of the present invention will be discussed in detail.

The paint film of the present invention is formed on an article to be coated, by successively forming a undercoat paint film, a base coat paint film on the undercoat paint film, and a clear paint film using the above-mentioned solvent-based topcoating material.

By this, the laminated coating film is improved in scratch resistance and chipping resistance.

Typical examples of the above-mentioned article to be coated are a variety of metal materials such as iron, aluminum, copper and the like, a variety of organic materials such as polypropylene, polycarbonate and the like, and a variety of inorganic materials such as quartz, ceramics (calcium carbide and the like) and the like.

Additionally, as methods for coating these with the solvent-based topcoating material on these, known and usual methods can be used. Examples of such known and usual methods are brushing, spaying, electrostatic coating, electrodeposition coating, powder coating, sputtering and the like.

Further, the above-mentioned solvent-based topcoating material is formed into a paint film typically by heating hardening (baking) treatment.

A whole surface or a partial surface of the article to be coated is coated with the above-mentioned solvent-based coating material. Additionally, in general, the above-mentioned base coat paint film includes a clear layer, and the enamel paint film does not include a clear layer.

Additionally, in the laminated coating film of the present invention, it is preferable from the viewpoint of adhesion, that an undercoat paint film is further formed between the article to be coated and the base coat paint film.

Another laminated film of the present invention is obtained by forming the enamel paint film using the above-mentioned solvent-based topcoating material on the article to be coated.

By this, the laminated film is improved in scratch resistance and chipping resistance. Additionally, the laminated coating film becomes good in smoothness.

Additionally, it is preferable that the undercoat paint film is further formed between the article to be coated and the enamel paint film. At this time, by causing the undercoat paint film to contain a certain resin and/or the like, it is possible that a crosslinking structure with the oleophilic polyrotaxane is formed at an interface between the undercoating paint film and the enamel paint film, thereby improving adhesion and the like.

An example (schematic cross-section) of the laminated coating films of the present invention as discussed above is shown in FIGS. 3 and 4.

The laminated coating film shown in FIG. 3 is constituted of a undercoat paint film layer 10, a base coat paint film 11, and an a clear paint film 12 as a curable solvent-based topcoating material of the present invention, formed on the base coat paint film. Additionally, the laminated coating film shown in FIG. 4 is formed by successively forming an undercoat paint film 10 and an enamel paint film 11 as the curable solvent-based topcoating material of the present invention.

The "laminated coating film" includes a coating film formed by coating the article to be coated, with only the solvent-based topcoating material for the purpose of simplicity of illustration. However, this coating film is not limited to a single layer and may be formed of a plurality of layers.

EXAMPLES

Hereinafter, the present invention will be discussed in detail with reference to concrete examples; however, the present invention is not limited to the examples set forth below.

Example 1

(1) Preparation of PEG-Carboxylic Acid by TEMPO Oxidation of PEG

Polyethylene glycol (PEG) (molecular weight: 1000) in an amount of 10 g, 100 mg of TEMPO (2,2,6,6-tetramethyl-1-piperidinyl-oxy radical) and 1 g of sodium bromide were dissolved in 100 ml of water. An aqueous solution of commercially available sodium hypochlorite (available chlorine concentration: 5%) in amount of 5 ml was added and stirred at room temperature for 10 minutes. In order to decompose excessive sodium hypochlorite, ethanol was added to an extent of 5 ml in maximum so as to terminate the reaction.

An extraction using 50 ml of methylene chloride was repeated three times thereby to extract components other than inorganic salts. Thereafter, methylene chloride was distilled out from the extracted components by an evaporator. Then, the components were dissolved in warm ethanol and then allowed to stand in a freezer (−4° C.) overnight thereby extracting only PEG-carboxylic acid, followed by recovering and drying.

(2) Preparation of Inclusion Complex by Using PEG-Carboxylic Acid and α-CD

The above-mentioned prepared PEG-carboxylic acid in an amount of 3 g and 12 g of α-cyclodextrin (α-CD) were respectively dissolved in 50 ml of 70° C. warm water and 50 ml of 70° C. warm water which were respectively prepared, upon which they were mixed and well stirred, followed by being allowed to stand in a refrigerator (4° C.) overnight. Then, an inclusion complex precipitated in a cream-state was lyophilized and recovered.

(3) Amount Reduction of α-CD and Blocking of the Inclusion Complex Using Adamantane Amine and Bop Reagent Reaction System The above-mentioned prepared inclusion complex in an amount of 14 g was dispersed in a mixture solvent of dimethylformamide/dimethylsulfoxide (DMF/DMSO) (75/25 in volume ratio).

On the one hand, 3 g of benzotirazole-1-yl-oxy-tris (dimethylamino)phosphonium hexafluorophosphate (BOP reagent), 1 g of 1-hydroxybenzotriazole (HOBt), 1.4 g of adamantane amine and 1.25 ml of diisopropylethyl amine were dissolved in this order in 10 ml of DMF at room temperature. This solution was added to the above-mentioned prepared dispersion solution and quickly shaken to be mixed.

A sample in a slurry state was allowed to stand in a refrigerator (4° C.) overnight. After being allowed to stand overnight, 50 ml of a mixture solvent of DMF/methanol (1/1 in volume ratio) was added, and then it was mixed and centrifuged, followed by discarding a supernatant. Washing with the above-mentioned mixture solvent of DMF/methanol was repeated two times, and thereafter washing with 100 ml of methanol was further repeated two times under a similar centrifugation.

An obtained precipitate was dried under a vacuum-drying, and thereafter it was dissolved in 50 ml of DMSO, upon which an obtained transparent solution was dropped into 700 ml of water thereby precipitating polyrotaxane. The precipitated polyrotaxane was recovered by a centrifugation, and then vacuum-dried or lyophilized.

A cycle including dissolving in DMSO, precipitation in water, recovery and drying, as above-mentioned, was repeated two times, thereby finally obtaining purified polyrotaxane.

(4) Hydroxylpropylation of Hydroxyl Groups of Cyclodextrin

The above-mentioned prepared polyrotaxane in an amount of 500 mg was dissolved in 50 ml of 1 mol/l aqueous solution of NaOH, followed by addition of 3.83 g (66 mmol) of propylene oxide. Then, it was stirred overnight in an atmosphere of argon at room temperature. Then, it was neutralized with 1 mol/l aqueous solution of HCl, and dialyzed by a dialysis tube. Thereafter, it was lyophilized and recovered thereby obtaining a hydrophilic modified polyrotaxane of this Example. The obtained hydrophilic modified polyrotaxane was identified with $^1$H-NMR and GPC thereby confirming that it was a desired polyrotaxane. Here, the inclusion amount of α-CD was 0.06, and the modification degree with hydrophilic modification groups was 0.1.

(5) Hydrophobic Group Modification of Polyrotaxane

To 500 mg of the above-mentioned prepared hydroxylpropylated polyrotaxane, 10 ml of ε-caprolactone dried by a molecular sieve was added and stirred at the room temperature for 30 minutes so as to be infiltrated. Then, 0.2 ml of tin 2-ethylhexanoate was added, and then a reaction was carried out at 100° C. for 1 hour.

After completion of the reaction, a sample was dissolved in 50 ml of toluene and dropped into 450 ml of stirred hexane so as to be precipitated, recovered and dried, thereby obtaining a hydrophobic modified polyrotaxane of this Example.

The obtained hydrophobic modified polyrotaxane was identified with $^1$H-NMR and GPC thereby confirming that it was a desired polyrotaxane. Here, the inclusion amount of α-CD was 0.06, and the modification degree with hydrophobic modification groups was 0.02.

(6) Preparation of Clear Paint

The obtained polyrotaxane was dissolved in toluene to form a 10% solution.

Subsequently, the dissolved polyrotaxane was added under stirring to an acrylic•melamine curable clear paint which was Bell Coat No. 6200GN1 of NOF Corporation.

(7) Formation of Laminated Coating Film

A cationic electrodeposition paint (the trade name "POWERTOP U600M": a cationic electrodeposition paint produced by NIPPON PAINT CO., LTD.) was electrodeposition-coated on a zinc phosphate-treated dull steel plate of 0.8 mm thickness by 70 mm wide by 150 mm long by so as to form a paint film having a dried film thickness of 20 μm, followed by baking at 160° C. for 30 minutes.

Thereafter, a gray undercoat (the trade name: Hi-Epico No. 500) of NOF Corporation was coated on the paint film so as to have a paint film having a thickness of 30 μm and then baked at 140° C. for 30 minutes.

Subsequently, a paint Bell Coat No. 6010 metallic color produced by NOF Corporation was painted to form a paint film having 15 μm thickness, and then the clear paint containing polyrotaxane was painted in a wet-on-wet manner to form a paint film of 30 μm thickness, followed by baking at 140° C. for 30 minutes.

Example 9

(1) Preparation of PEG-Carboxylic Acid by TEMPO Oxidation of PEG

Polyethylene glycol (PEG) (molecular weight: 35,000) in an amount of 10 g, 100 mg of TEMPO (2,2,6,6-tetramethyl-1-piperidinyl-oxy radical) and 1 g of sodium bromide were dissolved in 100 ml of water. An aqueous solution of commercially available sodium hypochlorite (available chlorine concentration: 5%) in amount of 5 ml was added and stirred at room temperature for 10 minutes. In order to decompose excessive sodium hypochlorite, ethanol was added to an extent of 5 ml in maximum so as to terminate the reaction.

An extraction using 50 ml of methylene chloride was repeated three times thereby to extract components other than inorganic salts. Thereafter, methylene chloride was distilled out from the extracted components by an evaporator. Then, the components were dissolved in warm ethanol and then allowed to stand in a freezer (−4° C.) overnight thereby extracting only PEG-carboxylic acid, followed by recovering and drying.

(2) Preparation of Inclusion Complex by Using PEG-Carboxylic Acid and α-CD

The above-mentioned prepared PEG-carboxylic acid in an amount of 3 g and 12 g of α-cyclodextrin (α-CD) were respectively dissolved in 50 ml of 70° C. warm water and 50 ml of 70° C. warm water which were respectively prepared, upon which they were mixed and well stirred, followed by being allowed to stand in a refrigerator (4° C.) overnight. Then, an inclusion complex precipitated in a cream-state was lyophilized and recovered.

(3) Blocking of the Inclusion Complex Using Adamantane Amine and BOP Reagent Reaction System BOP reagent in amount of 3 g, 1 g of HOBt, 1.4 g of adamantane amine and 1.25 ml of diisopropylethyl amine were dissolved in this order in 10 ml of DMF at room temperature. To this, 14 g of the above-mentioned prepared inclusion complex was added, and quickly shaken to be mixed.

A sample in a slurry state was allowed to stand in a refrigerator (4° C.) overnight. After being allowed to stand overnight, 50 ml of a mixture solvent of DMF/methanol (1/1 in volume ratio) was added, and then it was mixed and centrifuged, followed by discarding a supernatant. Washing with the above-mentioned mixture solvent of DMF/methanol was repeated two times, and thereafter washing with 100 ml of methanol was further repeated two times under a similar centrifugation.

An obtained precipitate was dried under a vacuum-drying, and thereafter it was dissolved in 50 ml of DMSO, upon which an obtained transparent solution was dropped into 700 ml of water thereby precipitating polyrotaxane. The precipitated polyrotaxane was recovered by a centrifugation, and then vacuum-dried or lyophilized.

A cycle including dissolving in DMSO, precipitation in water, recovery and drying, as above-mentioned, was repeated two times, thereby finally obtaining purified polyrotaxane.

(4) Hydroxylpropylation of Hydroxyl Groups of Cyclodextrin

The above-mentioned prepared polyrotaxane in an amount of 500 mg was dissolved in 50 ml of 1 mol/l aqueous solution of NaOH, followed by addition of 3.83 g (66 mmol) of propylene oxide. Then, it was stirred overnight in an atmosphere of argon at room temperature. Then, it was neutralized with 1 mol/l aqueous solution of HCl, and dialyzed by a dialysis tube. Thereafter, it was lyophilized and recovered.

(5) Hydrophobic Group Modification of Polyrotaxane

To 500 mg of the above-mentioned prepared hydroxylpropylated polyrotaxane, 10 ml of ε-caprolactone dried by a molecular sieve was added and stirred at the room temperature for 30 minutes so as to be infiltrated. Then, 0.2 ml of tin 2-ethylhexanoate was added, and then a reaction was carried out at 100° C. for 1 hour.

After completion of the reaction, a sample was dissolved in 50 ml of toluene and dropped into 450 ml of stirred hexane so as to be precipitated, recovered and dried, thereby obtaining a hydrophobic modified polyrotaxane of this Example.

The obtained hydrophobic modified polyrotaxane was identified with $^1$H-NMR and GPC thereby confirming that it was a desired polyrotaxane. Here, the inclusion amount of α-CD was 0.61, and the modification degree with hydrophobic modification groups was 0.02.

(6) Preparation of Colored Topcoating Material (Enamel)

The obtained polyrotaxane was dissolved in toluene to form a 10% solution.

Subsequently, the dissolved polyrotaxane was added under stirring to an acrylic melamine curable enamel paint (black paint color) which was Bell Coat No. 6010 produced NOF Corporation.

Comparative Example 6

(1) Preparation of PEG-Carboxylic Acid by TEMPO Oxidation of PEG

Polyethylene glycol (PEG) (molecular weight: 5000) in an amount of 10 g, 100 mg of TEMPO (2,2,6,6-tetramethyl-1-piperidinyl-oxy radical) and 1 g of sodium bromide were dissolved in 100 ml of water. An aqueous solution of commercially available sodium hypochlorite (available chlorine concentration: 5%) in amount of 5 ml was added and stirred at room temperature for 10 minutes. In order to decompose excessive sodium hypochlorite, ethanol was added to an extent of 5 ml in maximum so as to terminate the reaction.

An extraction using 50 ml of methylene chloride was repeated three times thereby to extract components other than inorganic salts. Thereafter, methylene chloride was distilled out from the extracted components by an evaporator. Then, the components were dissolved in warm ethanol and then allowed to stand in a freezer (−4° C.) overnight thereby extracting only PEG-carboxylic acid, followed by recovering and drying.

(2) Preparation of Inclusion Complex by Using PEG-Carboxylic Acid and α-CD

The above-mentioned prepared PEG-carboxylic acid in an amount of 3 g and 12 g of α-cyclodextrin (α-CD) were respectively dissolved in 50 ml of 70° C. warm water and 50 ml of 70° C. warm water which were respectively prepared, upon which they were mixed and well stirred, followed by being allowed to stand in a refrigerator (4° C.) overnight. Then, an inclusion complex precipitated in a cream-state was lyophilized and recovered.

(3) Amount Reduction of α-CD and Blocking of the Inclusion Complex Using Adamantane Amine and BOP Reagent Reaction System The above-mentioned prepared inclusion complex in an amount of 14 g was dispersed in a mixture solvent of dimethylformamide/dimethylsulfoxide (DMF/DMSO) (75/25 in volume ratio).

On the one hand, 3 g of benzotirazole-1-yl-oxy-tris (dimethylamino)phosphonium hexafluorophosphate (BOP reagent), 1 g of 1-hydroxybenzotriazole (HOBt), 1.4 g of adamantane amine and 1.25 ml of diisopropylethyl amine were dissolved in this order in 10 ml of DMF at room temperature. This solution was added to the above-mentioned prepared dispersion solution and quickly shaken to be mixed.

A sample in a slurry state was allowed to stand in a refrigerator (4° C.) overnight. After being allowed to stand overnight, 50 ml of a mixture solvent of DMF/methanol (1/1 in volume ratio) was added, and then it was mixed and centrifuged, followed by discarding a supernatant. Washing with the above-mentioned mixture solvent of DMF/methanol was repeated two times, and thereafter washing with 100 ml of methanol was further repeated two times under a similar centrifugation.

An obtained precipitate was dried under a vacuum-drying, and thereafter it was dissolved in 50 ml of DMSO, upon which an obtained transparent solution was dropped into 700 ml of water thereby precipitating polyrotaxane. The precipitated polyrotaxane was recovered by a centrifugation, and then vacuum-dried or lyophilized.

A cycle including dissolving in DMSO, precipitation in water, recovery and drying, as above-mentioned, was repeated two times, thereby finally obtaining a purified polyrotaxane.

(4) Hydroxylpropylation of Hydroxyl Groups of Cyclodextrin

The above-mentioned prepared polyrotaxane in an amount of 500 mg was dissolved in 50 ml of 1 mol/l aqueous solution of NaOH, followed by addition of 3.83 g (66 mmol) of propylene oxide. Then, it was stirred overnight in an atmosphere of argon at room temperature. Then, it was neutralized with 1 mol/l aqueous solution of HCl, and dialyzed by a dialysis tube. Thereafter, it was lyophilized and recovered thereby obtaining a hydrophilic modified polyrotaxane of this Example. The obtained hydrophilic modified polyrotaxane was identified with $^1$H-NMR and GPC thereby confirming that it was a desired polyrotaxane. Here, the inclusion amount of α-CD was 0.06, and the modification degree with hydrophilic modification groups was 0.1.

(5) Preparation of Clear Paint

The obtained polyrotaxane was dissolved in toluene to form a 10% solution.

Subsequently, the dissolved polyrotaxane was added under stirring to an acrylic melamine curable clear paint which was Bell Coat No. 6200GN1 produced by NOF Corporation.

(6) Formation of Laminated Coating Film

A cationic electrodeposition paint (the trade name "POWERTOP U600M": a cationic electrodeposition paint produced by NIPPON PAINT CO., LTD.) was electrodeposition-coated on a zinc phosphate-treated dull steel plate of 0.8 mm thickness by 70 mm wide by 150 mm long by so as to form a paint film having a dried film thickness of 20 μm, followed by baking at 160° C. for 30 minutes.

Thereafter, a gray undercoat (the trade name: Hi-Epico No. 500) of NOF Corporation was coated on the paint film so as to have a paint film having a thickness of 30 μm and then baked at 140° C. for 30 minutes.

Subsequently, a paint Bell Coat No. 6010 metallic color produced NOF Corporation was painted to form a paint film having 15 μm thickness, and then the clear paint containing polyrotaxane was painted in a wet-on-wet manner to form a paint film of 30 μm thickness, followed by baking at 140° C. for 30 minutes.

Examples 2 to 8, and 10 to 14, and Comparative Examples 1 to 5

Operations similar to those of Example 1 were repeated except for specifications as shown in Table 1, thereby to form a laminated coating film.

Evaluations (1) to (6) set forth below were carried out on the obtained laminated coating films.

(1) Solubility

The colored topcoating material obtained at the step 2 was mixed with it, and then application was made on a glass plate, upon which the cloudiness was evaluated with the eye.

◯: Transparent

Δ: Slightly cloudy x: Cloudy and separated (2) Smoothness

The smoothness degree of the topcoating paint film in the laminated coating film obtained at the step 3 was evaluated with the eye.

◯: Considerably smooth

Δ: Slightly uneven x: Uneven (3) Marring Resistance

A dust flannel (friction cloth) was fixed to a sliding member of an abrasion testing machine with an adhesive tape. Then, the dust flannel was reciprocated 50 times on the topcoating paint film obtained at the step 3 under a load of 0.22 g/cm$^2$. Then, presence or absence of scratch formed was evaluated.

◯: Nearly no scratch formed

Δ: Slight scratch formed x: Much scratches formed so as to be conspicuous (4) Sedimentation of Pigment The colored topcoating material obtained at the step 2 was allowed to stand in a thermostatic chamber at 40° C. for one month. Then, a judgment was made as to whether a deposit became a hard cake (solidified and in a condition not to be recovered) or not.

◯: Recovered

Δ: Recovered though a time was required x: Not recovered (5) Reactivity

The polyrotaxane obtained at the step 1 was mixed with hexamethylene diisocyanate in an equivalent ratio, and then baked and dried at 140° C. for 30 minutes. A judgment was made as to whether urethane linkage was present or absent upon measuring an infrared ray absorption spectrum.

◯: Urethane linkage present x: Urethane linkage absent (6) Weatherability

A test was carried out for 1440 hours on the topcoating paint film in the laminated coating film obtained at the step 3 by using a xenon weathrometer (XWOM). Then, measurement of a color difference (ΔE) was made.

◯: ΔE≦5

Δ: 3<ΔE≦5 x: ΔE>5

TABLE 1

| Items | Polyrotaxane | | | |
|---|---|---|---|---|
| | Molecular weight of PEG | Inclusion amount of α-CD | Modification degree with hydrophobic modification group | Content (%) in paint film |
| Example 1 | 1,000 | 0.06 | 0.02 | 50 |
| Example 2 | 1,000 | 0.61 | 0.02 | 50 |
| Example 3 | 45,000 | 0.06 | 0.02 | 50 |
| Example 4 | 45,000 | 0.61 | 0.02 | 50 |
| Example 5 | 35,000 | 0.61 | 0.02 | 1 |
| Example 6 | 35,000 | 0.61 | 0.02 | 50 |
| Example 7 | 35,000 | 0.61 | 0.02 | 50 |
| Example 8 | 35,000 | 0.61 | 0.02 | 90 |
| Example 9 | 35,000 | 0.61 | 0.02 | 1 |
| Example 10 | 35,000 | 0.61 | 0.02 | 50 |
| Example 11 | 35,000 | 0.61 | 0.5 | 50 |
| Example 12 | 35,000 | 0.61 | 0.02 | 90 |
| Example 13 | 500 | 0.61 | 0.5 | 50 |
| Example 14 | 100,000 | 0.61 | 0.5 | 50 |
| Comparative example 1 | 35,000 | 0.61 | 0.02 | 0 |
| Comparative example 2 | 500 | 0.06 | 0 | 50 |
| Comparative example 3 | 500 | 0.61 | 0 | 50 |
| Comparative example 4 | 100,000 | 0.06 | 0 | 50 |
| Comparative example 5 | 100,000 | 0.61 | 0 | 50 |
| Comparative example 6 | 100,000 | 0.61 | 0.1 (hydrophilic group) | 50 |

| Items | Coating material | | | Paint film performance | | | |
|---|---|---|---|---|---|---|---|
| | Paint kind | Solubility to paint | Sedimentation of pigment | Reactivity | Smoothness | Marring resistance | Weatherability |
| Example 1 | Clear paint | ○ | — | ○ | ○ | Δ | ○ |
| Example 2 | Clear paint | ○ | — | ○ | ○ | Δ | ○ |
| Example 3 | Clear paint | ○ | — | ○ | ○ | ○ | ○ |
| Example 4 | Clear paint | ○ | — | ○ | ○ | ○ | ○ |
| Example 5 | Clear paint | ○ | — | ○ | ○ | Δ | ○ |
| Example 6 | Clear paint | ○ | — | ○ | ○ | ○ | ○ |
| Example 7 | Clear paint | ○ | — | ○ | ○ | ○ | ○ |
| Example 8 | Clear paint | ○ | — | ○ | ○ | ○ | ○ |
| Example 9 | Enamel paint | ○ | ○ | ○ | ○ | Δ | ○ |
| Example 10 | Enamel paint | ○ | ○ | ○ | ○ | ○ | ○ |
| Example 11 | Enamel paint | ○ | ○ | ○ | ○ | ○ | ○ |
| Example 12 | Enamel paint | ○ | ○ | ○ | ○ | ○ | ○ |
| Example 13 | Clear paint | Δ | — | ○ | ○ | Δ | ○ |
| Example 14 | Clear paint | Δ | — | ○ | Δ | Δ | Δ |
| Comparative example 1 | Clear paint | — | — | — | ○ | X | ○ |
| Comparative example 2 | Clear paint | X | — | X | X | X | ○ |
| Comparative example 3 | Clear paint | X | — | X | X | X | ○ |
| Comparative example 4 | Clear paint | X | — | X | X | X | Δ |
| Comparative example 5 | Clear paint | X | — | X | X | X | Δ |
| Comparative example 6 | Clear paint | X | — | ○ | X | X | Δ |

As apparent from results of Table 1, it was confirmed not only that the curable solvent-based topcoating materials of Examples 1 to 14 according to the present invention exhibited a good solubility owing to the hydrophobicity of polyrotaxane while exhibiting an excellent sedimentation resistance of pigment, but also that a marring resistance was improved depending on the pulley effect of the above-mentioned polyrotaxane while exhibiting good appearance and weatherability.

Regarding Examples 13 and 14, the molecular weight of the linear molecule is outside a preferable range, and therefore it was confirmed that there is a tendency that some performances were slightly inferior; however, they were judged to be within a usable level as a whole.

It was revealed that marring resistance, solubility and smoothness of paint film were inferior in Comparative Example 1 in which no polyrotaxane was contained, and in Comparative Examples 2 to 6 using non-hydrophilic polyrotaxane whose α-CD (cyclodextrin) was non-modified or modified with hydrophilic modification groups.

As discussed above, according to the present invention, an objective appearance can be obtained in the same operational efficiency as in usual coatings while making it possible to improve the scratch resistance of the colored topcoating paint film.

EXPLANATION OF REFERENCE NUMERALS

Figure 1:
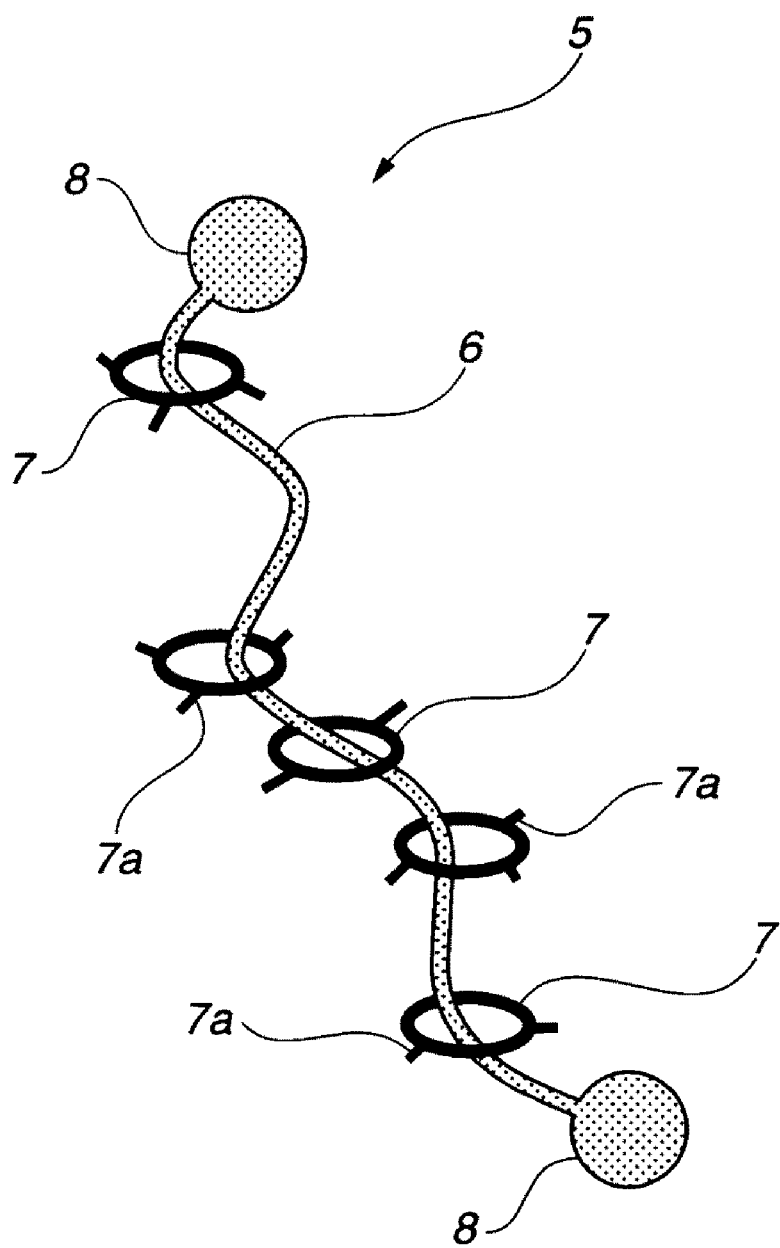
FIG. 1 A schematic illustration conceptually showing a hydrophobic modified polyrotaxane.
Figure 2:
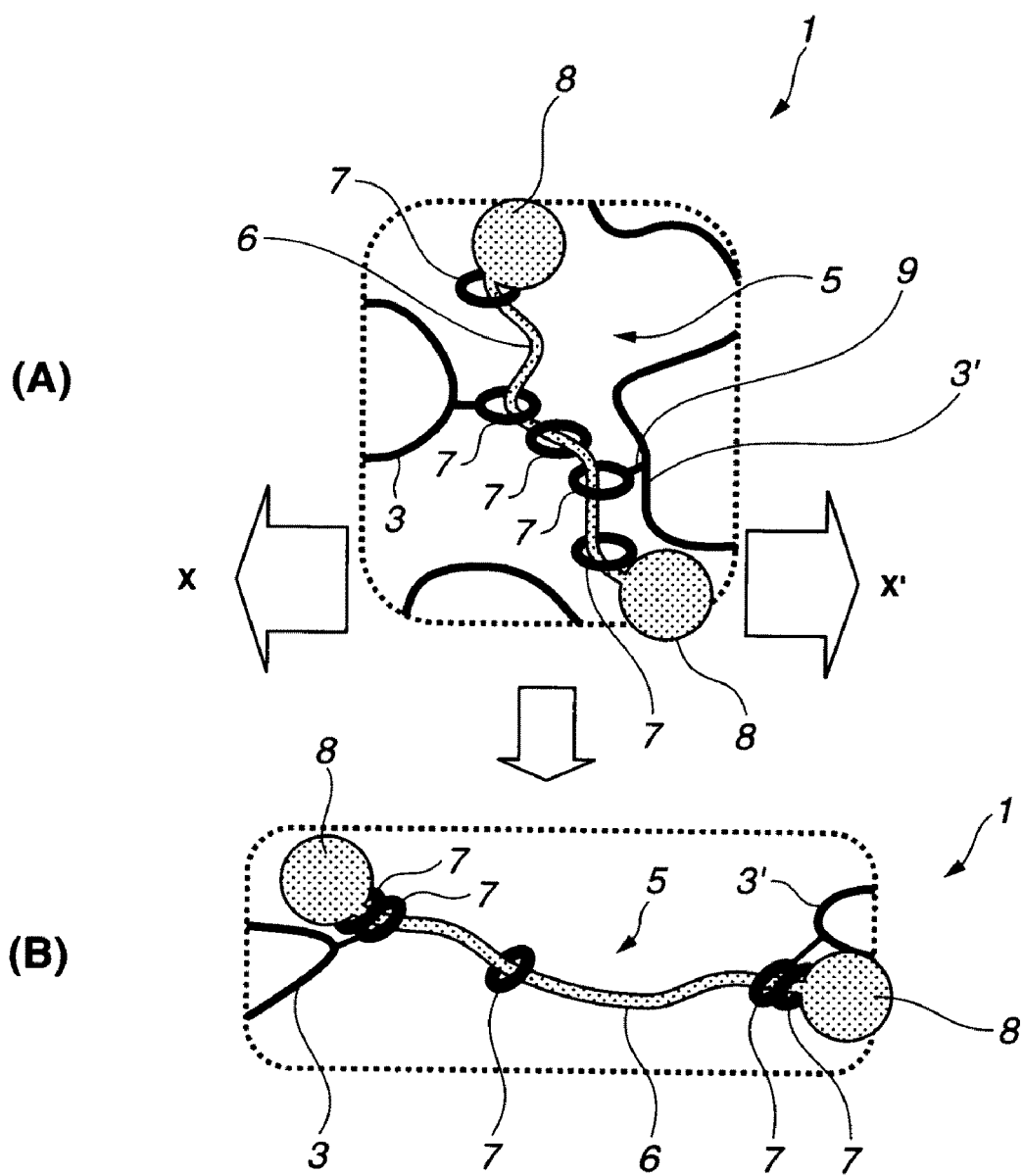
FIG. 2 A schematic illustration conceptually showing a crosslinked polyrotaxane
Figure 3:
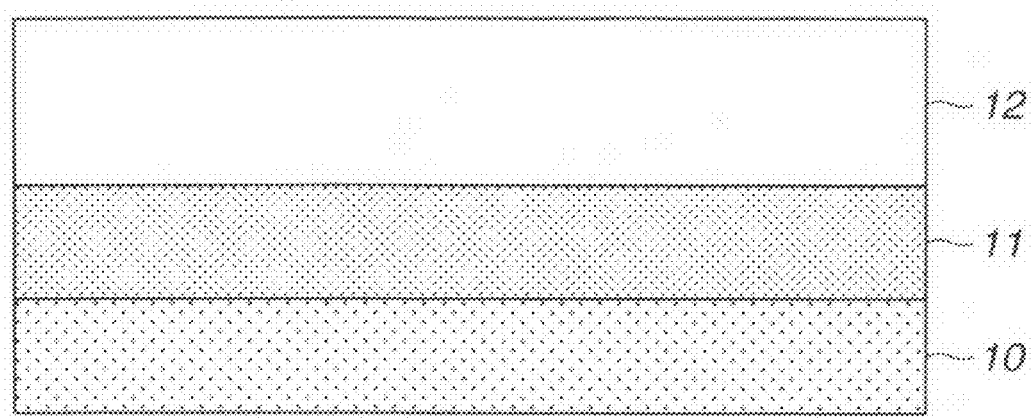
FIG. 3 A schematic sectional view showing a structural example of a laminated coating film of the present invention.
Figure 4:
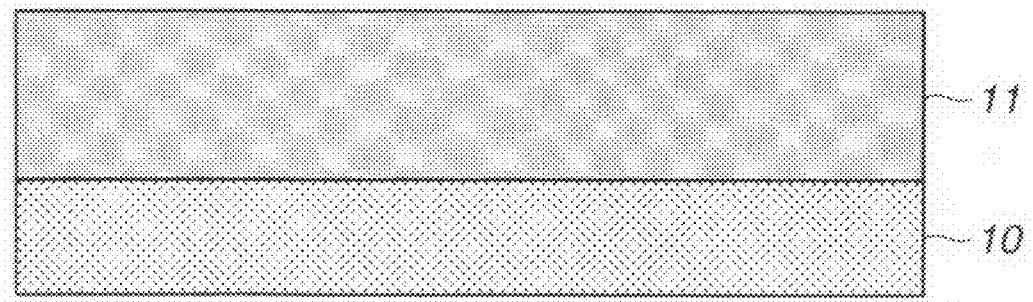
FIG. 4 A schematic sectional view showing another structural example of the laminated coating film of the present invention.

| | |
|---|---|
| 1 | crosslinked polyrotaxane |
| 3, 3' | polymer |
| 5 | hydrophobic modified polyrotaxane |
| 6 | linear molecule |
| 7 | cyclic molecule (cyclodextrin) |
| 8 | blocking group |
| 9 | crosslinking point |
| 10 | undercoating paint film |
| 11 | enamel paint film |

The invention claimed is:

1. A curable solvent-based coating material, characterized by comprising an oleophilic polyrotaxane and a resin, the oleophilic polyrotaxane including a cyclic molecule, a linear molecule piercing through the cyclic molecule, and blocking groups which are placed at both end terminals of the linear molecule to prevent the cyclic molecule from leaving from the linear molecule, at least one of the liner molecule and the cyclic molecule having a hydrophobic modification group which is at least one selected from the group consisting of alkyl group, benzyl group, benzene derivative-containing group, acyl group, silyl group, trityl group, tosyl group, urethane linkage, ester linkage, ether linkage and caprolactone.

2. A curable solvent-based coating material as claimed in claim 1, wherein the hydrophobic modification group includes (—CO(CH$_2$)$_5$OH) group.

3. A curable solvent-based coating material as claimed in claim 1, wherein the hydrophobic modification group includes (—CO(CH$_2$)$_5$OH) group linked to (—O—C$_3$H$_6$—O—) group.

4. A curable solvent-based coating material as claimed in claim 1, wherein the cyclic molecule has an inclusion amount ranging from 0.06 to 0.61 relative to 1 which is the maximum inclusion amount of the cyclic molecule capable of being included by the linear molecule.

5. A curable solvent-based coating material as claimed in claim 1, wherein the linear molecule has a molecular weight ranging from 1,000 to 45,000.

6. A curable solvent-based coating material as claimed in claim 1, wherein the linear molecule is at least one of polyethylene glycol and polycaprolactone.

7. A curable solvent-based coating material as claimed in claim 1, wherein the cyclic molecule is at least one selected from the group consisting of α-cyclodextrin, β-cyclodextrin and γ-cyclodextrin.

8. A curable solvent-based coating material as claimed in claim 7, wherein hydroxyl groups of the cyclodextrin are modified in a modification degree of not less than 0.02 relative to 1 which is the maximum number of the hydroxyl groups of the cyclodextrin which hydroxyl groups are capable of being modified.

9. A curable solvent-based coating material as claimed in claim 1, wherein the oleophilic polyrotaxane is contained in an amount of 1 to 90% by mass relative to coating film forming components.

10. A curable solvent-based coating material as claimed in claim 1, wherein the coating material is mixed with at least one selected from the group consisting of a resinous component, a hardening agent, an additive, a pigment, a brightening agent, and a solvent.

11. A curable solvent-based coating material as claimed in claim 1, wherein the curable solvent-based coating material is one of a gloss paint and a flat paint.

12. A curable solvent-based coating material as claimed in claim 1, wherein the curable solvent-based coating material is one of a clear paint, a base coat paint, and an enamel paint.

13. A solvent-based coating paint film, characterized by being formed by solidifying a curable solvent-based coating material as claimed in claim 1.

14. A laminated coating film using the solvent-based coating material as claimed in claim 1,
wherein a base coat paint film and a clear paint film using the solvent-based coating material are successively formed on an article to be coated.

15. A laminated coating film as claimed in claim 14, wherein an undercoat paint film is further formed between the article to be coated and the base coat paint film.

16. A laminated coating film using the solvent-based coating material as darned in claim 1,
wherein a base coat paint film using the solvent-based coating material and a clear paint film are successively formed on an article to be coated.

17. A laminated coating film as claimed in claim 16, wherein an undercoat paint film is further formed between the article to be coated and the base coat paint film.

18. A laminated coating film using the solvent-based coating material as claimed in claim 1,
wherein an enamel paint film using the solvent-based coating material is formed on an article to be coated.

19. A laminated coating film as claimed in claim 18, wherein an undercoat paint film is further formed between the article to be coated and the enamel paint film.

20. A laminated coating film using the solvent-based coating material as claimed in claim 1,
wherein a base coat paint film using the solvent-based coating material and a clear paint film using the solvent-based coating material are successively formed on an article to be coated.

21. A laminated coating film as claimed in claim 20, wherein an undercoat paint film is further formed between the article to be coated and the base coat paint film.

* * * * *

UNITED STATES PATENT AND TRADEMARK OFFICE
CERTIFICATE OF CORRECTION

| | | |
|---|---|---|
| PATENT NO. | : 7,893,155 B2 | Page 1 of 1 |
| APPLICATION NO. | : 12/662128 | |
| DATED | : February 22, 2011 | |
| INVENTOR(S) | : Kohzo Ito et al. | |

It is certified that error appears in the above-identified patent and that said Letters Patent is hereby corrected as shown below:

ON THE TITLE PAGE:
Item (54) the title of the invention has a typographic error. The correct title is:

MATERIAL FOR CURABLE SOLVENT-BASED TOPCOATING MATERIAL, AND COATING MATERIAL AND COATING FILM COMPRISING OR FORMED FROM THE SAME

IN THE SPECIFICATIONS:
Column 1, Line 1: the title should read:

MATERIAL FOR CURABLE SOLVENT-BASED TOPCOATING MATERIAL, AND COATING MATERIAL AND COATING FILM COMPRISING OR FORMED FROM THE SAME

Signed and Sealed this
Fifth Day of April, 2011

David J. Kappos
*Director of the United States Patent and Trademark Office*